United States Patent
Kim et al.

(10) Patent No.: US 9,497,690 B2
(45) Date of Patent: Nov. 15, 2016

(54) ACCESS METHOD BETWEEN A TERMINAL AND A BASE STATION IN A WIRELESS COMMUNICATION SYSTEM AND APPARATUS THEREOF

(75) Inventors: Suhwook Kim, Anyang-si (KR);
Yongho Seok, Anyang-si (KR);
Bonghoe Kim, Anyang-si (KR);
Eunsun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 224 days.

(21) Appl. No.: 13/885,559

(22) PCT Filed: Dec. 8, 2011

(86) PCT No.: PCT/KR2011/009491
§ 371 (c)(1),
(2), (4) Date: May 15, 2013

(87) PCT Pub. No.: WO2012/078000
PCT Pub. Date: Jun. 14, 2012

(65) Prior Publication Data
US 2013/0237192 A1    Sep. 12, 2013

Related U.S. Application Data

(60) Provisional application No. 61/421,620, filed on Dec. 9, 2010, provisional application No. 61/424,676, filed on Dec. 20, 2010.

(51) Int. Cl.
*H04W 48/16*    (2009.01)
*H04W 12/06*    (2009.01)
(Continued)

(52) U.S. Cl.
CPC ............ *H04W 48/16* (2013.01); *H04W 12/06* (2013.01); *H04W 52/367* (2013.01); *H04W 4/005* (2013.01); *H04W 48/12* (2013.01); *H04W 48/20* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 5,627,882 A | * | 5/1997 | Chien ............... | H04W 52/0232 340/7.33 |
| 6,169,943 B1 | * | 1/2001 | Simon ............... | G07C 5/008 340/901 |

(Continued)

FOREIGN PATENT DOCUMENTS

| KR | 10-2008-0079961 | 9/2008 |
|----|-----------------|--------|
| KR | 10-2009-0050533 | 5/2009 |
| KR | 10-2010-0125611 | 12/2010 |

OTHER PUBLICATIONS

PCT International Application No. PCT/KR2011/009491, Written Opinion of the International Searching Authority dated Jun. 22, 2012, 16 pages.

(Continued)

*Primary Examiner* — Quan M Hua
(74) *Attorney, Agent, or Firm* — Lee, Hong, Degerman, Kang & Walmey; Jonathan Kang; Michael Monaco

(57) ABSTRACT

The present description relates to a method in which a terminal accesses a base station in a wireless communication system and to a terminal thereof. The method includes broadcasting, to at least one base station, an advertisement message containing identification information for advertising existence of the terminal; receiving, from the base station, an inviting message which allows access to the base station; and performing an access procedure with the base station in accordance with the received inviting message. The present description further relates to a method in which a base station accesses a terminal in a wireless communication system, the method including receiving an advertisement message which is broadcasted by the terminal and contains identification information for advertising existence of the terminal; transmitting, to the terminal, an inviting message which allows access to the base station; and performing an access procedure with the terminal in accordance with the inviting message.

8 Claims, 4 Drawing Sheets

(51) Int. Cl.
*H04W 52/36* (2009.01)
*H04W 48/20* (2009.01)
*H04W 4/00* (2009.01)
*H04W 84/12* (2009.01)
*H04W 48/12* (2009.01)

(56) References Cited

U.S. PATENT DOCUMENTS

| | | | |
|---|---|---|---|
| 2004/0208151 A1* | 10/2004 | Haverinen et al. | 370/338 |
| 2006/0092888 A1* | 5/2006 | Jeong | H04W 48/14 370/338 |
| 2007/0186105 A1* | 8/2007 | Bailey et al. | 713/168 |
| 2008/0057936 A1* | 3/2008 | Oosawa | 455/422.1 |
| 2008/0151814 A1* | 6/2008 | Jokela | 370/328 |
| 2008/0170497 A1* | 7/2008 | Jeong et al. | 370/230 |
| 2010/0067486 A1* | 3/2010 | Masuda | H04W 36/0011 370/331 |

OTHER PUBLICATIONS

Johnsson, et al., "Suggested Updates on Requirements for Low Power Consumption," IEEE 802.16 Broadband Wireless Access Working Group, IEEE C802.16p-10/0009r3, Nov. 2010, 4 pages.

PCT International Application No. PCT/KR2011/009491, Written Opinion of the International Searching Authority dated Jun. 22, 2012, 9 pages.

\* cited by examiner

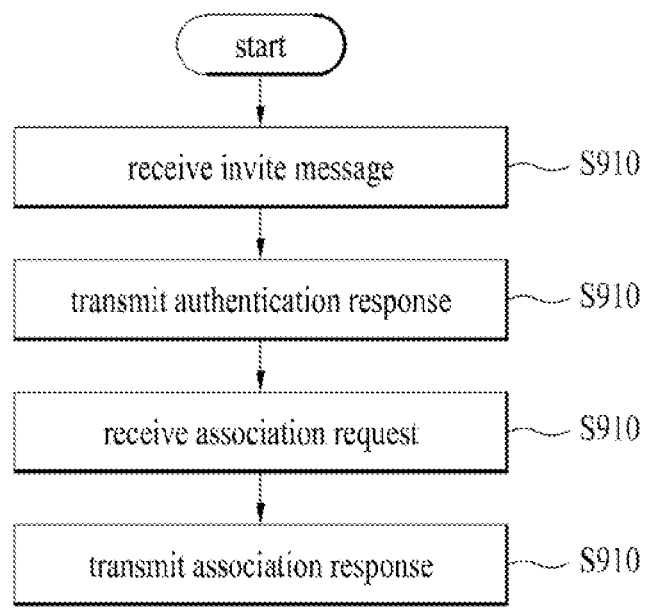

ACCESS METHOD BETWEEN A TERMINAL AND A BASE STATION IN A WIRELESS COMMUNICATION SYSTEM AND APPARATUS THEREOF

CROSS-REFERENCE TO RELATED APPLICATIONS

This application is the National Stage filing under 35 U.S.C. 371 of International Application No. PCT/KR2011/009491, filed on December 8, 2011, which claims the benefit of U.S. Provisional Application Ser. No. 61/421,620, filed on Dec. 9, 2010, and U.S. Provisional Application Ser. No. 61/424,676, filed on Dec. 20, 2010, the contents of which are all hereby incorporated by reference herein in their entirety.

TECHNICAL FIELD

The present invention relates to a method of accessing between a mobile station and a base station in a wireless communication system and apparatus therefor.

BACKGROUND ART

Generally, a mobile station makes a request for information to a base station and the base station provides a corresponding information to the mobile station in a wireless communication system. In particular, many communication systems up to now have been developed centering on a downlink.

Yet, this structure changes in a machine-to-machine (hereinafter abbreviate M2M) communication network. In particular, the mobile station becomes a main agent providing an information and the base station makes a request for the information instead in the M2M communication network.

Hence, in case of a general wireless communication, the mobile station discovers a nearby network when the mobile station initially operates and selects a network to access according to a result of the discovered network. Yet, in case of an M2M communication, since a machine is unable to directly select a network, it should be controlled by a base station designated in advance or a network.

Yet, the aforementioned method of discovering and selecting a network performed by the mobile station in the M2M communication may have a problem as follows.

First of all, since the mobile station has to repeatedly perform a discovery process in all channels until a prescribed network is found, power consumption is considerable.

Secondly, the M2M communication network is assumed to have a huge number of mobile stations. Since many management frames should be sent for each of the mobile stations to perform a search and selection for a network, it may cause a waste of radio resource.

Thirdly, in case that the mobile station performs a search and selection for a network, a network management problem may occur since there exists a chance that the mobile station does not receive correctly a data or a control command to be transmitted by the base station.

DISCLOSURE OF THE INVENTION

Technical Task

The present specification provides a method of accessing between a mobile station and a base station intended to reduce a function owned by a legacy mobile station and enlarge a management function of a base station centering on a search and selection function for a network in an M2M communication network environment and apparatus therefor.

And, the present specification provides a method of accessing between a mobile station and a base station, which performs a search and selection for a network in an M2M communication network environment.

Technical Solution

According to a method of accessing between a mobile station and a base station, which is disclosed in the present specification, a method of accessing a base station, which is accessed by a mobile station in a wireless communication includes the steps of broadcasting an advertising message containing an identification information to inform an existence of the mobile station to at least one base station, receiving an invite message permitting an access to the base station from the base station, and performing an access procedure with the base station according to the received invite message.

And, the advertising message includes a sleep interval and a listening duration.

And, if the invite message is not received for the listening duration, the method further includes the step of operating in a sleep mode.

And, the advertising message includes at least one selected from the group consisting of a MAC address of the mobile station, a type of the mobile station, and a service category.

And, the invite message includes at least one selected from the group consisting of an address of the base station, an ID of the base station, a capability, a power constraint, and supported rates.

And, the invite message includes an authentication information containing an authentication algorithm and an authentication key of the mobile station.

And, the access procedure performing step include the step of performing an authentication procedure with the base station for an authentication, wherein the authentication procedure is performed by transmitting an authentication response to the base station based on the invite message containing the authentication information.

According to a mobile station disclosed in the present specification, the mobile station, which accesses a base station in a wireless communication system, includes a radio communication unit configured to tranceive a radio signal with an external and a control unit configured to broadcast an advertising message containing an identification information to inform an existence of the mobile station to at least one base station by controlling the radio communication unit, the control unit configured to receive an invite message permitting an access to the base station from the base station, the control unit configured to perform an access procedure with the base station according to the received invite message.

And, the advertising message includes a sleep interval and a listening duration.

And, if the invite message is not received for the listening duration, the control unit is configured to control to operate in a sleep mode.

And, the advertising message includes at least one selected from the group consisting of a MAC address of the mobile station, a type of the mobile station, and a service category.

And, the invite message includes at least one selected from the group consisting of an address of the base station, an ID of the base station, a capability, a power constraint, and supported rates.

And, the invite message includes an authentication information containing an authentication algorithm and an authentication key of the mobile station.

And, the processor is configured to transmit an authentication response to the base station based on the invite message containing the authentication information by controlling the radio communication unit.

According to a method of accessing between a mobile station and a base station, which is disclosed in the present specification, a method of accessing a mobile station, which is accessed by a base station in a wireless communication includes the steps of receiving an advertising message broadcasted by the mobile station and containing identification information to inform an existence of the mobile station, transmitting an invite message permitting an access to the base station to the mobile station, and performing an access procedure with the mobile station according to the invite message.

And, the invite message transmitting step includes the steps of judging whether the base station accesses the mobile station based on the advertising message and transmitting the invite message to the mobile station according to a result of the judgment.

And, the advertising message includes a MAC address of the mobile station, a type of the mobile station, a service category, a sleep interval, and a listening duration.

And, the invite message includes at least one selected from the group consisting of an address of the base station, an ID of the base station, a capability, a power constraint, and supported rates.

And, the invite message includes an authentication information containing an authentication algorithm and an authentication key of the mobile station.

And, the access procedure performing step includes the step of performing an authentication procedure with the mobile station for an authentication, wherein the authentication procedure is performed by receiving an authentication response from the mobile station based on the invite message containing the authentication information.

Advantageous Effects

According to the method of accessing a network and apparatus therefor disclosed in the present specification, it is not necessary for a mobile station to search for a network. The mobile station periodically informs brief information on the mobile station and may be able to operate in a sleep mode for the rest of time, thereby reducing power consumption.

According to the method of accessing a network and apparatus therefor disclosed in the present specification, since a base station may be able to select a mobile station based on the information transmitted by the mobile station, the base station may be able to avoid a connection request from a not preferable mobile station and may be able to actively manage a network in a manner of controlling the number of connected mobile station and the like.

According to the method of accessing a network and apparatus therefor disclosed in the present specification, since a mobile station transmits information on the mobile station only on a channel to be used by the mobile station, it is able to efficiently manage a radio resource in a manner of avoiding an unnecessary channel search, an unnecessary frame transmission, or a collision between base stations.

DESCRIPTION OF DRAWINGS

FIG. 9 is a flowchart of an access procedure of a mobile station accessing a base station via an authentication according to a $2^{nd}$ embodiment disclosed in the present specification.

BEST MODE

Mode for Invention

Figure 1:
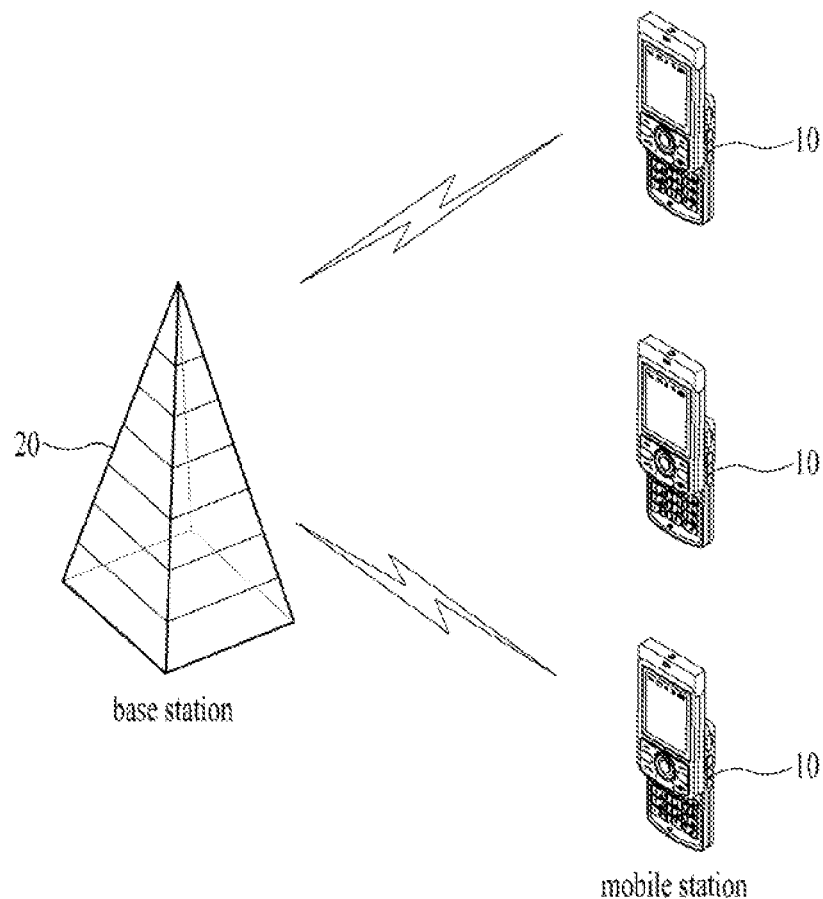
FIG. 1 is a diagram of a wireless communication system.

The technical terminologies used in the present specification are used only to describe a specific embodiment(s) and have no intention to restrict the present invention. The technical terminologies used in the present specification should be construed not as excessively inclusive meanings or excessively reduced meanings but as meanings generally understood by those having ordinary skill in the technical field, to which the present invention pertains, unless defined as other meanings especially in the present specification.

And, the singular number representation used in the present specification may include the plural number representation unless mentioned clearly and differently in context. In the present application, such a terminology as 'configured', 'include' and the like should be construed not as necessarily including various components or steps written in the present specification but as including the components or steps in part or further including additional components or steps.

And, in describing the technology disclosed in the present invention, if the detailed description of the related art is determined as making the point of the technology disclosed in present invention unclear, it will be omitted. The accompanying drawings, which are included to provide a further understanding of the invention and are incorporated in and constitute a part of this specification, illustrate embodiments of the invention and together with the description serve to explain the principles of the invention only. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The following technology can be used for various wireless access systems including CDMA (code division multiple access), FDMA (frequency division multiple access), TDMA (time division multiple access), OFDMA (orthogonal frequency division multiple access), SC-FDMA (single carrier frequency division multiple access), and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. IEEE 802.16m is an evolved version of IEEE 802.16e and may provide a backward compatibility to a system based on IEEE. 802.16e.

UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA (Evolved-UMTS terrestrial radio access). The 3GPP LTE adopts OFDMA in downlink and SC-FDMA in uplink. And, LTE-A (LTE-Advanced) is an evolved version of 3GPP LTE.

For clarity, the following description mainly concerns IEEE 802.11, by which the technical idea of the present invention may be non-limited.

In the following description, embodiments disclosed in the present specification are explained in detail with reference to the attached drawings.

FIG. 1 is a diagram of a wireless communication system.

The wireless communication system is widely arranged to provide such a various communication service as an audio, a packet data, and the like.

Referring to FIG. 1, the wireless communication system includes a mobile station (MS) 10 and a base station (BS) 20. The mobile station 10 is fixed or may have mobility. The mobile station can be called such a different terminology as a user equipment (UE), a user terminal (UT), a subscriber station (SS), a wireless device, an advanced mobile station (AMS), and the like.

The base station 20 indicates a fixed station communicating with the mobile station 10 in general. The base station can be called such a different terminology as a node B, a base transceiver system (BTS), an access point, and the like. One base station 20 may include more than one cell.

The wireless communication system may be a system based on OFDM (Orthogonal Frequency Division Multiplexing)/OFDMA (Orthogonal Frequency Division Multiplexing Access).

OFDM uses a plurality of orthogonal subcarriers. OFDM uses orthogonal property between IFFT (inverse fast Fourier transform) and FFT (fast Fourier transform). A transmitter transmits a data in a manner of performing the IFFT. A receiver restores an original data in a manner of performing the FFT for a reception signal. The transmitter uses the IFFT to combine multiple subcarriers and the receiver uses the corresponding FFT to separate the multiple subcarriers.

And, a slot corresponds to a minimum available data assignment unit and is defined by time and a sub channel. The sub channel can be configured with a plurality of tiles in uplink. The sub channel is configured with 6 tiles. One burst can be configured with 3 OFDM symbols and one sub channel in uplink.

In PUSC (Partial Usage of Sub channels) permutation, each tile may be able to include 4 contiguous subcarriers on 3 OFDM symbols. Selectively, each tile may be able to include 3 contiguous subcarriers on 3 OFDM symbols. A bin includes 9 contiguous subcarriers on an OFDM symbol. A band indicates a group of 4 rows of the bin and an AMC (Adaptive modulation and Coding) sub channel is configured with 6 contiguous bins in an identical band.

Figure 2:
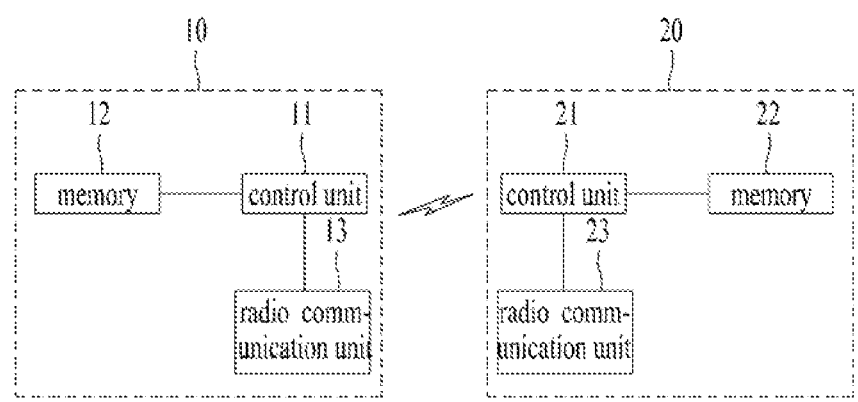
FIG. 2 is an inside block diagram of a mobile station and a base station in a wireless communication system.

FIG. 2 is an inside block diagram of a mobile station and a base station in a wireless communication system.

The mobile station 10 may include a control unit 11, a memory 12, and a radio communication (RF) unit 13.

And, the mobile station 10 may be able to include a display unit, a user interface unit, and the like.

The control unit 11 is configured to implement a proposed function, process, and/or a method. Layers of a wireless interface protocol can be implemented by the control unit 11.

The memory 12 is configured to store a protocol and a parameter to perform a wireless communication in a manner of being connected to the control unit 11. In particular, the memory stores a mobile station operating system, an application, and a general file.

The RF unit 13 is configured to transmit and/or receive a radio signal in a manner of being connected to the control unit 11.

In addition, the display unit is configured to display various information of a mobile station and can use such a well-known element as a LCD (Liquid Crystal Display), an OLED (Organic Light Emitting Diodes), or the like. The user interface unit can be configured by a combination of such a well-known user interface as a key pad, a touch screen, or the like.

The base station 20 may include a control unit 21, a memory 22, and a radio communication (RF) unit 23.

The control unit 21 is configured to implement a proposed function, process, and/or a method. Layers of a wireless interface protocol can be implemented by the control unit 21.

The memory 22 is configured to store a protocol and a parameter to perform a wireless communication in a manner of being connected to the control unit 21.

The RF unit 23 is configured to transmit and/or receive a radio signal in a manner of being connected to the control unit 21.

The control unit 11/21 may be able to include an ASIC (application-specific integrated circuit), a different chipset, a logical circuit and/or a data processing device. The memory 12/22 may be able to include a ROM (read-only memory), a RAM (random access memory), a flash memory, a memory card, a storing media and/or a different storing device. The RF unit 13/23 may be able to include a baseband circuit to process a radio signal. In case of implementing an embodiment with software, the aforementioned scheme can be implemented by a module (a process, a function, or the like) performing the aforementioned function. The module is stored in the memory 12/22 and can be executed by the control unit 11/21.

The memory 12/22 can be situated at the inside or outside of the control unit 11/21 and can be connected to the control unit 11/21 with a well-known means.

Connection Procedure

Figure 3:
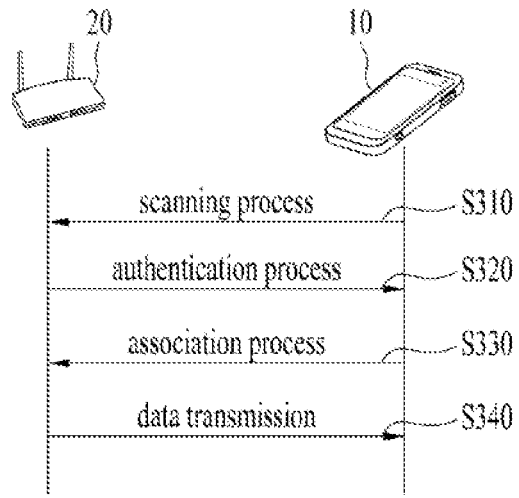
FIG. 3 is a flowchart of a connection process to transmit a data in a wireless communication system of FIG. 1.

FIG. 3 is a flowchart of a connection process to transmit a data in a wireless communication system of FIG. 1.

Referring to FIG. 3, a connection process for a data transmission between the mobile station 10 and the base station 20 in a wireless communication system 100 may be able to include a scanning process S310, an authentication process S320, and an association process S330. The mobile station 10 and the base station 20 perform a data transmission process S340 in a manner of passing through the above processes S310/S320/S330.

The scanning process S310 is a process searching for a nearby base station 20 using a Beacon or a probe message.

The scanning process S310 includes a passive scanning process searching for a base station 20 capable of being accessed by a beacon message periodically transmitted by the base station 20 and an active scanning process selecting the base station 20 capable of being accessed by the mobile station 10 in a manner of transmitting a probe request and receiving a probe response storing an SSID (Service Set ID) of the base station, operation speed, and the like from the base station 20. The beacon message stores various capabilities (speed, encryption, and the like) supported by the base station 20 and the SSID (Service Set ID), which is a name of a service group to which the base station belongs thereto.

The authentication process S320 is a process verifying that the mobile station 10 is a valid mobile station for a corresponding base station 20, performed by the mobile station, which selected an appropriate base station 20 via the scanning process S310. In particular, the authentication process S320 is the process that the mobile station 10 negotiates an authentication procedure and an encryption scheme with the base station 20. In this case, since an open system authentication scheme is used in a large percentage of cases, the base station 20 unconditionally authenticates an authentication request of the mobile station 10. A more fortified authentication scheme may include IEEE 802.1x-based EAP-TLS, EAP-TTLS, EAS-FAST, PEAP, and the like.

The association process S330 is a process that the mobile station 10 accesses the base station 20 after a successful authentication. The association process S330 means to establish an identifiable connection between the mobile station 10 and the base station 20. If the association process S330 is over, the mobile station 10 may be able to communicate with a different mobile station via the base station 20.

In case that the mobile station 10 transmits an association request to the base station 20, the association process S330 is performed in a manner that the base station 20 transmits an association response storing an AID (Association ID), which makes distinct from the different mobile station.

The mobile station 10 and the base station 20 perform the data transmission process S340 in a manner of passing through the aforementioned processes S310/S320/S330.

Similar to the association process S330, there exists a re-association process. The re-association process is a process that the mobile station 10 establishes a connection with a base station 20 different from the connected based station 20. The re-association process is the process that the mobile station 10 establishes a new connection with a different base station in case that a signal from the connected base station becomes weak.

Machine to Machine Communication (M2M)

In the following description, a machine to machine (M2M) communication is briefly described.

The machine to machine (hereinafter abbreviated M2M) communication literally means a communication between electronic devices. In particular, it means the communication between objects. In general, the M2M communication means a wired or wireless communication between electronic devices or the communication between a human-controlled device and a machine, but the M2M communication can be used for a meaning specifically indicating the communication between electronic devices, in particular, a wireless communication between devices. And, M2M mobile stations used in a cellular network have a low performance or capability compared to general mobile stations.

And, a characteristic of M2M environment is as follows.
1. a large number of mobile stations in a cell
2. small data quantity
3. a small number of transmission frequency
4. a limited number of data property
5. not sensitive to a time delay There exist a plurality of mobile stations in a cell and a plurality of the mobile stations can be distinguished from each other according to a type, a class, a service type of the mobile stations. In particular, if the machine to machine (M2M) communication (or a machine type communication (MTC)) is considered, a total number of the mobile stations may rapidly increase. According to a service supporting the M2M mobile station, M2M mobile stations may have a property as follows.
1. M2M mobile station intermittently transmits a data. In this case, the m2M mobile station may have periodicity.
2. M2M mobile station has low mobility or is fixed.
3. In general, M2M mobile station is not sensitive to latency in a signal transmission.

A plurality of the M2M mobile stations in a cell having the aforementioned property may be able to transceive a signal between mobile stations or with a base station using a multi-hop configuration or a hierarchical structure.

In particular, the M2M mobile stations may be able to transmit a data to an M2M mobile station existing in a different layer or a lower layer in a manner of receiving a signal from the base station or may be able to transmit a signal to a different M2M mobile station or the base station in a manner of receiving the signal from different M2M mobile stations. Or, it may be able to perform a direct communication not between relays but between mobile stations.

In order to perform a signal transmission between the M2M mobile stations of this comprehensive meaning, each of the M2M mobile stations may be able to transmit the signal in a manner of being connected to each other in a form of an upper/lower structure. (In case of a direct communication between mobile stations, there may not exist an upper/lower concept. Yet, it is possible to explain the upper/lower concept in a manner of identically applying the upper/lower concept)

As one example, in terms of a downlink transmission, an MS 1 receives a signal transmitted by a base station and then transmits the signal to an MS 2. In this case, the MS 1 may be able to transmit the signal to a different mobile station MS situated at a lower rank as well as the MS 2. In this case, the MS 2 indicates the mobile station situated at the lower rank of the MS 1.

Having received the signal from the MS 1, the MS 2 transmits the received signal to the MS situated at the lower of the MS 2. In the same manner, the signal is transmitted to an MS N. In this case, a plurality of mobile stations can be connected to each other in a form of a multi-hop or hierarchically between the MS 2 and the MS N.

As a different example, in terms of an uplink transmission, a signal can be transmitted for the signal transmission between M2M mobile stations as follows. An M2M mobile station situated at a lower rank may be able to transmit the signal to a different M2M mobile station or the base station using an M2M mobile station of an upper rank.

Terminologies used in an M2M system are summarized as follows.

(1) Machine-to-Machine (M2M) communication: indicates information exchange capable of being performed without a human engagement between user devices via a base station or between a server and a device via a base station in a core network.

(2) M2M ASN: indicates an access service network capable of supporting an M2M service.

(3) M2M device: indicates a mobile station having (or supporting) an M2M function.

(4) M2M subscriber: indicates a consumer of an M2M service.

(5) M2M server: indicates an entity capable of communicating with an M2M device. The M2M server provides an interface accessible by the M2M subscriber.

(6) M2M feature: indicates a unique property of an M2M application supported by the M2M ASN. One or more properties may be necessary to support the application.

(7) M2M group: indicates a group of M2M mobile stations including a common and/or an identical M2M subscriber, i.e., sharing one or more properties.

In the following description, methods of accessing a network, which is accessed by an M2M mobile station in a wireless communication system according to the embodiment disclosed in the present specification is described with reference to drawings.

The following description mainly concerns IEEE 802.11, by which the method proposed by the present specification may be non-limited to the 802.11 system. It is apparent that the method proposed by the present specification can be used in LTE, LTE-A, and the like.

1st Embodiment

The $1^{st}$ embodiment provides a method of accessing, which is accessed by a mobile station defined by the 802.11 system and a base station using an advertising message and an invitation message.

Figure 4:
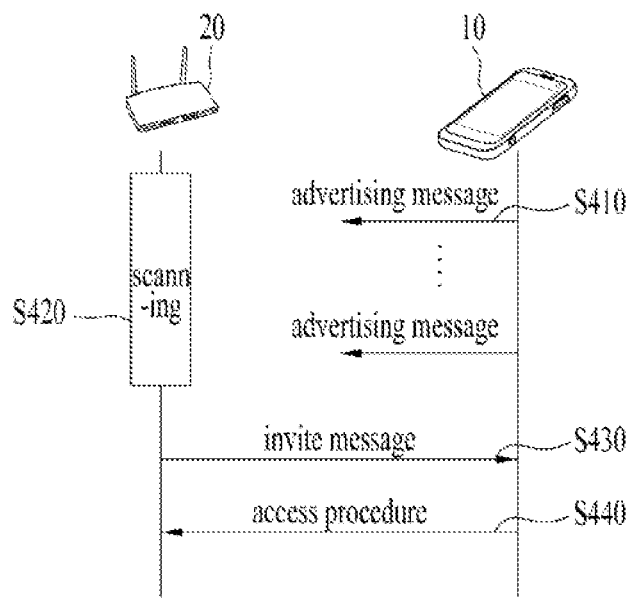
FIG. 4 is a flowchart of a method of accessing between a mobile station and a base station according to a $1^{st}$ embodiment disclosed in the present specification.

FIG. 4 is a flowchart of a method of accessing between a mobile station and a base station according to a $1^{st}$ embodiment disclosed in the present specification.

Referring to FIG. 4, the mobile station 10 broadcasts an advertising message to at least one base station 20 [S410].

The mobile station 10 may be able to broadcast the advertising message to inform at least one base station 20 existing in a range capable of communicating of the existence of the mobile station 10. In this case, the mobile station 10 may be able to broadcast the advertising message in a manner of randomly selecting a channel among the channels available for the mobile station 10.

The advertising message may be able to include identification information to inform the existence of the mobile station 10. And, the advertising message may be able to include information necessary for making a request for a connection for a data communication to the base station 20. In particular, according to the embodiment disclosed in the present specification, the advertising message may be able to include a sleep interval of the mobile station 10 and a listening duration.

And, as shown in FIG. 4, the mobile station 10 may be able to repeatedly broadcast the advertising message. After broadcasting the advertising message, if there is no response from the base station 20 for the listening duration, the mobile station 10 may be able to operate in a sleep mode to reduce power consumption. In this case, the mobile station 10 operates in the sleep mode for the sleep interval and may be then able to broadcast the advertising message again in a manner of being waked-up after the sleep interval. The mobile station 10 may be able to repeatedly and periodically broadcast the advertising message by repeating the aforementioned operation.

A detail frame format of the advertising message is explained with reference to FIG. 5 in the following description.

While the advertising message is broadcasted by the mobile station 10, the base station 20 may be able to perform a scanning to receive the advertising message [S420].

The base station 20 may be able to find out the advertising message broadcasted by the mobile station 10 in a manner of switching all channels available for the base station 20. If the advertising message is found out on a specific channel, the base station 20 stops the channel switching and may be able to perform an operation to establish a connection to the mobile station 10 by receiving the advertising message.

Thereafter, the base station 20 transmits an invite message to the mobile station 10 [S430].

The base station 20 may be able to transmit the invite message permitting an access to the base station 20 to the mobile station 10.

If the invite message is not received for the listening duration included in the invite message, the mobile station 10 may be able to operate in the sleep mode. Hence, the base station 20 checks the listening duration included in the invite message from the timing point of receiving the advertising message, if the listening duration is not expired yet, the base station may be able to transmit the invite message to the mobile station 10.

In this case, the base station 20 judges whether to access the mobile station 10 based on the advertising message and may be able to transmit the invite message to the mobile station 10 according to a result of the judgment.

Specifically, the base station 20 judges whether the base station accesses the mobile station 10 based on the advertising message. In particular, the base station 20 may be able to judge whether the mobile station 10 is a base station 20 supportive of mobile station or whether the mobile station 10 is able to normally perform a data communication with the base station 20 according to the information on the mobile station 10 included in the advertising message. If the result of the judgment says to access the mobile station 10, the base station 20 may be able to transmit the invite message to the mobile station 10.

A detail frame format of the invite message is explained in detail with reference to FIG. 6 in the following description.

As a last step, the mobile station 10 and the base station 20 perform an access procedure [S440].

The mobile station 10 may be able to perform an access procedure for a data communication with the base station 20 according to the received invite message. In this case, the access procedure may be able to include an authentication procedure between the mobile station 10 and the base station 20 if necessary.

Figure 5:
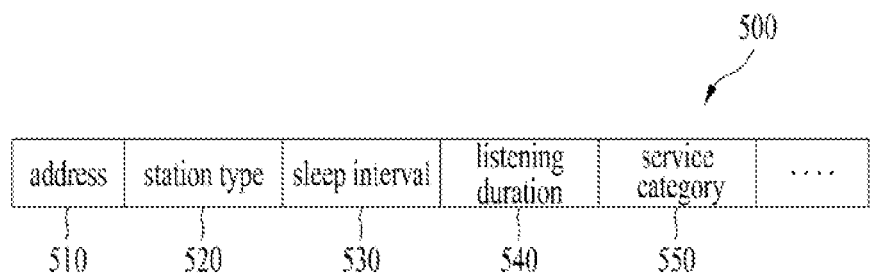
FIG. 5 is a diagram of a frame format of an advertising message according to a $1^{st}$ embodiment disclosed in the present specification.

FIG. 5 is a diagram of a frame format of an advertising message according to a $1^{st}$ embodiment disclosed in the present specification.

Referring to FIG. 5, the advertising message 500 may be able to include an address 510, a station type 520, a sleep interval 530, a listening duration 540, and a service category 550.

The address 510 may include an MAC address of the mobile station 10 to identify the mobile station 10.

The station type 520 may include information indicating a kind of the mobile station 10. In particular, in case that the mobile station 10 corresponds to an M2M mobile station, since the M2M mobile station may have a great variety of kinds, the station type 520 may be able to include the information indicating the kind of the M2M mobile station to distinguish the kind of the M2M mobile station.

For instance, in case that the mobile station 10 corresponds to a communication module built in a refrigerator operating in a home network or in case that the mobile station 10 corresponds to a communication module built in a TV, the station type 520 may have a value different from each other.

The station type 520 can be used to provide a station management function, which is supported by the base station 20 according to the kind of the mobile station 10. And, the station type 520 can be used to determine an access procedure or an authentication procedure to access the base station 20.

The sleep interval 530 includes the information indicating a length of time that the mobile station 10 operates in a sleep mode. While operating in the sleep mode, the mobile station 10 may not receive a downlink data to reduce power consumption. And, while operating in the sleep mode, the mobile station 10 may not supply power to one or more physical configuration units or may not perform a communication with the base station 20.

According to the embodiment disclosed in the present specification, the sleep interval 530 may be able to indicate a time space between the times for transmitting the advertising message by the mobile station 10. In particular, after broadcasting the advertising message, if the mobile station 10 receives no response for a prescribed time, the mobile station operates in the sleep mode. After the sleep interval 530 is passed by, the mobile station wakes up and may be then able to transmit the advertising message again.

The listening duration 540 may be able to include time information indicating a length of time that the mobile station 10 waits for a response.

According to the embodiment disclosed in the present specification, the listening duration 540 may be able to indicate the time waiting for the reception of the invite message from the base station 20 for the advertising message broadcasted by the mobile station 10.

The service category 550 may be able to include the information on the requirement capable of being supported by the mobile station 10 according to the type of the mobile station 10. For instance, the service category 550 may be able to include a kind of application supported by the mobile station 10, position information, delay constraints, a minimum transmission rate, a maximum transmission rate, a traffic interval, a security requirement, and the like.

The service category 550 can be used for a network access control (admission control) of the base station 20.

In addition, the advertising message 500 may further include an identifier of the mobile station 10, a service set identifier (SSID), a timestamp, and the like.

All of the frame configuration elements of the advertising message depicted in FIG. 5 are not essential configuration elements. The advertising message 500 can be configured with less or more than the elements depicted in FIG. 5. And, in the present specification, there is no special limit on the order or the number of bit of the frame configuration element of the advertising message 500.

Figure 6:
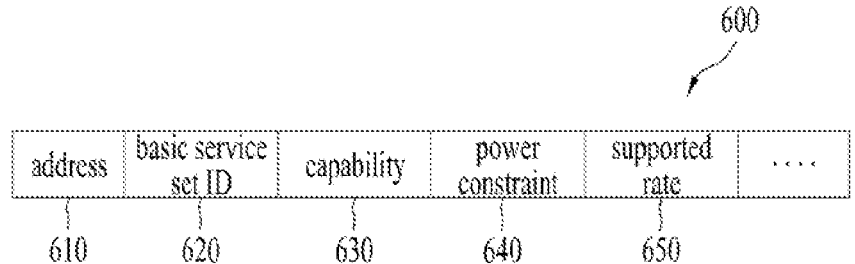
FIG. 6 is a diagram of a frame format of an invite message according to a $1^{st}$ embodiment disclosed in the present specification.

FIG. 6 is a diagram of a frame format of an invite message according to a $1^{st}$ embodiment disclosed in the present specification.

Referring to FIG. 6, the invite message 600 may be able to include an address 610, a basic service set ID (BSSID) 620, a capability 630, a power constraint 640, and a supported rate 650.

The address may be able to include an MAC address of the base station 20 to identify the base station 20.

The basic service set ID 620 may be able to include the information indicating a basic service set ID managed by the base station 20, which transmits the invite message 600.

The capability 630 may be able to include the information indicating the capability of the base station 20.

The power constraint 640 may be able to include the information on the requirement of a radio wave regulation and a transmit power constraint of the base station 20. In this case, the transmit power constraint should be equal to the radio wave regulation or less than the radio wave regulation. The value of the power constraint 640 should be able to flexibly vary according to time.

The supported rate 650 may be able to include the information on a transmission speed capable of being supported by the base station 20 in transceiving a frame or a data.

Figure 7:
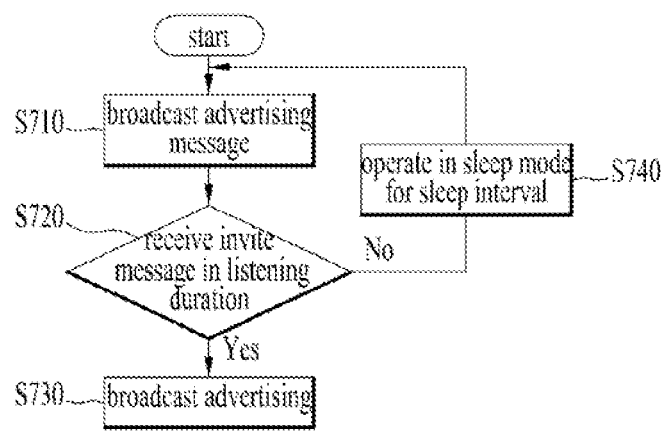
FIG. 7 is a flowchart of a method of accessing a base station, which is accessed by a mobile station, according to a $1^{st}$ embodiment disclosed in the present specification.

FIG. 7 is a flowchart of a method of accessing a base station, which is accessed by a mobile station, according to a $1^{st}$ embodiment disclosed in the present specification.

Referring to FIG. 7, the mobile station 10 broadcasts an advertising message to at least one base station 20 [S710].

The mobile station 10 may be able to broadcast the advertising message to inform at least one base station 20 existing in a range capable of communicating of the existence of the mobile station 10.

The advertising message may be able to include identification information to inform the existence of the mobile station 10 and/or a sleep interval and a listening duration of the mobile station 10.

Thereafter, the mobile station 10 judges whether an invite message is received in the listening duration [S720].

The mobile station 10 may be able to receive the invite message permitting an access to the base station 20 from the base station 20.

In case that the invite message is received in the listening duration, the mobile station 10 performs an access procedure with the base station 20 [S730].

According to the received invite message, the mobile station 10 may be able to perform the access procedure for a data communication. In this case, the access procedure may be able to include an authentication procedure between the mobile station 10 and the base station 20 if necessary.

In case that the invite message is not received in the listening duration, the mobile station 10 operates in the sleep mode for the sleep interval [S740]. If the mobile station 10 judges that there is no base station to access, the mobile station 10 may be able to operate in the sleep mode for the sleep interval to reduce power consumption. Thereafter, after the sleep interval is passed by, the mobile station 10 wakes up from the sleep mode and may be then able to broadcast the advertising message again.

$2^{nd}$ Embodiment

The $2^{nd}$ Embodiment provides a method of performing an authentication and an association, which is performed by a mobile station defined by the 802.11 system and a base station using an invite message.

Figure 8:
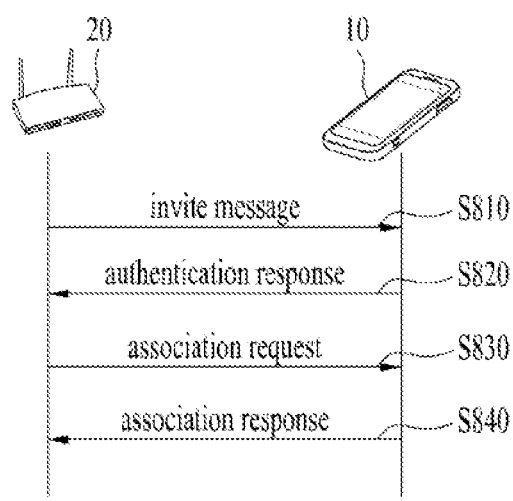
FIG. 8 is a flowchart of an access procedure via an authentication between a mobile station and a base station according to a $2^{nd}$ embodiment disclosed in the present specification.

FIG. 8 is a flowchart of an access procedure via an authentication between a mobile station and a base station according to a $2^{nd}$ embodiment disclosed in the present specification.

Referring to FIG. 8, the base station 20 transmits an invite message to the mobile station 10 [S810].

The base station 20 may be able to transmit the invite message permitting an access to the base station 20 to the mobile base station 10. The invite message may be able to include at least one selected from the group consisting of an address of the base station 20, a basic base station ID, a capability, a power constraint, and supported rates.

According to the $2^{nd}$ embodiment disclosed in the present specification, the invite message may be able to include authentication information to perform an authentication procedure with the mobile station 10. For instance, the invite message may be able to include an authentication algorithm between the base station 20 and the mobile station 10, a parameter necessary for the algorithm, a challenge text, and a shared key.

Thereafter, the mobile station 10 transmits an authentication response to the base station 20 [S820].

The mobile station 10 may be able to transmit the authentication response to the base station 20 based on the invite message including the authentication information. In this case, since the invite message includes the informations necessary for the authentication, the authentication response may have a function of acknowledge for the invite message.

The authentication response may be able to include an encrypted challenge text using a shared key for the authentication and the shared key.

Hence, the mobile station 10 and the base station 20 omit a process necessary for a 2-way handshaking via the invite message and may be able to perform the authentication procedure by the authentication response only.

Thereafter, the base station 20 transmits an association request to the mobile station [S830].

The base station 20 may be able to transmit the association request to connect to the mobile station 10. In this case, the association request may be able to include the information necessary for the base station 20 to connect to the mobile station 10. For instance, the association request may be able to include at least one selected from the group consisting of a supported data rates, a service set identifier (SSID), an association ID (AID).

A part of the informations can be included in the invite message in advance. In this case, the information included in the invite message in advance can be omitted.

As a last step, the mobile station 10 transmits an association response to the base station 20 [S840].

The mobile station 10 may be able to transmit the association response to the base station 20 in response to the association request. In this case, since the most of information for the association is included in the invite message or the association request, the association response may be able to include an additional part of information only. For instance, the association response may be able to include at least one selected from the group consisting of an association acceptance, a service set identifier, a connection ID.

FIG. 9 is a flowchart of an access procedure of a mobile station accessing a base station via an authentication according to a $2^{nd}$ embodiment disclosed in the present specification.

Referring to FIG. 9, the mobile station 10 receives an invite message from the base station 20 [S910].

The base station 20 may be able to transmit the invite message permitting an access to the base station 20 to the mobile station 10. The invite message may be able to include an authentication algorithm between the base station 20 and the mobile station 10, a parameter necessary for the algorithm, a challenge text, and a shared key.

Thereafter, the mobile station 10 transmits an authentication response to the base station 20 [S920].

The mobile station 10 may be able to transmit the authentication response to the base station 20 based on the invite message including the authentication information. The authentication response may be able to include a shared key for the authentication and a challenge text encrypted using the shared key.

Thereafter, the mobile station 10 receives an association request from the base station [S930].

The base station 20 may be able to transmit the association request to connect to the mobile station 10. In this case, the association request may be able to include the information necessary for the base station 20 to connect to the mobile station 10. For instance, the association request may be able to include at least one selected from the group consisting of a supported data rates, a service set identifier (SSID), an association ID (AID).

As a last step, the mobile station 10 transmits an association response to the base station 20 [S940].

The mobile station 10 may be able to transmit the association response to the base station 20 in response to the association request. In this case, since the most of information for the association is included in the invite message or the association request, the association response may be able to include an additional part of information only. For instance, the association response may be able to include at least one selected from the group consisting of an association acceptance, a service set identifier, a connection ID.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of accessing a base station by a first machine to machine (M2M) mobile station in a wireless communication, the method comprising:

broadcasting, to a base station via a first channel, an advertising message;

wherein the first channel is randomly selected by the first M2M mobile station among a plurality of channels available to the first M2M mobile station, wherein the advertisement message is relayed to the base station via a second M2M mobile station when the first channel is selected, and wherein the advertising message contains an address of the first M2M mobile station, a type of the first M2M mobile station, a service category, a sleep interval and a listening duration; and receiving, from the base station via the second M2M mobile station, an invite message permitting the first M2M mobile station to access the base station after the base station judges that the first M2M mobile station is permitted to access the base station based on the advertising message, wherein, when the first M2M mobile station receives the invite message from the base station in the listening duration, an access procedure with the base station is performed according to the invite message, wherein, when the first M2M mobile station does not receive the invite message from the base station in the listening duration, a sleep mode is performed during the sleep interval, wherein the advertising message is re-broadcasted via a second channel via the second M2M mobile station after the sleep interval is passed by, and wherein the second channel is randomly selected by the first M2M mobile station among a plurality of channels available to the first M2M mobile station.

2. The method of claim 1, wherein the invite message comprises at least one item selected from the group consisting of an address of the base station, an ID of the base station, a capability, a power constraint, and supported rates.

3. The method of claim 1, wherein the invite message comprises an authentication information containing an authentication algorithm and an authentication key of the first M2M mobile station.

4. The method of claim 3, wherein the access procedure comprises performing an authentication procedure with the base station, and wherein the authentication procedure is performed by transmitting an authentication response to the base station based on the invite message containing the authentication information.

5. A first machine to machine (M2M) mobile station configured to access a base station in a wireless communication system, the first M2M mobile station comprising:

a radio communication device configured to receive and to transmit a radio signal with an base station;

a memory configured to store a protocol and a parameter to perform a wireless communication; and a control device operatively connected to the radio communication device and the memory, the control device configured to:

broadcast, to a base station via a first channel, an advertising message, wherein the first channel is randomly selected by the first M2M mobile station among a plurality of channels available to the first M2M mobile station, wherein the advertisement message is relayed to the base station via a second M2M mobile station when the first channel is selected, and wherein the advertising message contains an address of the M2M mobile station, a station type of the M2M mobile station, a service category, a sleep interval and a listening duration, and receive, from the base station via the second M2M mobile station, an invite message permitting the first M2M mobile station to access the base station after the base station judges that the first M2M mobile station is permitted to access the base station based on the advertising message, wherein, when the first M2M mobile station receives the invite message from the base station in the listening duration, an access procedure with the base station is performed according to the invite message, wherein, when the first M2M mobile station does not receive the invite message from the base station in the listening duration, a sleep mode is performed during the sleep interval, wherein the advertising message is re-broadcasted via a second channel via the second M2M mobile station after the sleep interval is passed by, and wherein the second channel is randomly selected by the first M2M mobile station among a plurality of channels available to the first M2M mobile station.

6. The first M2M mobile station of claim 5, wherein the invite message comprises at least one item selected from the group consisting of an address of the base station, an ID of the base station, a capability, a power constraint, and supported rates.

7. The first M2M mobile station of claim 5, wherein the invite message comprises an authentication information containing an authentication algorithm and an authentication key of the first M2M mobile station.

8. The first M2M mobile station of claim 7, wherein the control device is further configured to transmit an authentication response to the base station based on the invite message containing the authentication information.

* * * * *